United States Patent

[11] 3,582,659

| [72] | Inventor | Manuel S. Dekker<br>20440 Parthenia, Canoga Park, Calif. 91304 |
|---|---|---|
| [21] | Appl. No. | 834,014 |
| [22] | Filed | June 17, 1969 |
| [45] | Patented | June 1, 1971 |

[54] SPECTROPHOTOMETER CIRCUIT WITH LINEAR RESPONSE TO ABSORBANCE
6 Claims, 10 Drawing Figs.

[52] U.S. Cl. .................................................. 250/214R,
307/229, 307/230, 324/132, 356/223, 356/224, 356/226
[51] Int. Cl. .................................................. H01j 39/12
[50] Field of Search .................................................. 250/214, 211; 324/132; 307/229, 230; 328/145; 356/223, 226, 224

[56] References Cited
UNITED STATES PATENTS

| 2,810,107 | 10/1957 | Sauber | 324/132 |
| 3,076,375 | 2/1963 | Donnell | 250/214X |
| 3,226,633 | 12/1965 | Schneider | 324/132 |
| 3,244,977 | 4/1966 | Folsom | 324/132X |
| 3,257,616 | 6/1966 | Andrushkiw et al. | 324/132X |
| 3,458,729 | 7/1969 | Klein | 307/229X |
| 3,465,169 | 9/1969 | Foerster | 307/238X |
| 3,483,475 | 12/1969 | Mitchell | 307/229X |

OTHER REFERENCES

Braun, "Wide-Response Amplifier with Automatic Threshold Control", IBM Technical Disclosure Bulletin, Vol. 8 No. 4 Sept. 1965, 250/219I

*Primary Examiner*—Archie R. Borchelt
*Assistant Examiner*—Charles M. Leedon
*Attorney*—Robert Louis Finkel

ABSTRACT: This photometer employs a network of negatively biased diodes to compensate for the nonlinear characteristics of its solid-state photodetector and detector circuit, and thereby linearize its electrical response with respect to absorbance. The instrument features an integrated, fixed-geometry cuvette holder, light aperture, monochromatic filter, photodetector, and incubator block with continuous electronic temperature control capability. Calibration is accomplished by varying the light intensity by means of a highly stable, finely adjustable variable lamp power supply.

PATENTED JUN 1 1971

INVENTOR.
MANUEL S. DEKKER

BY

ATTORNEY

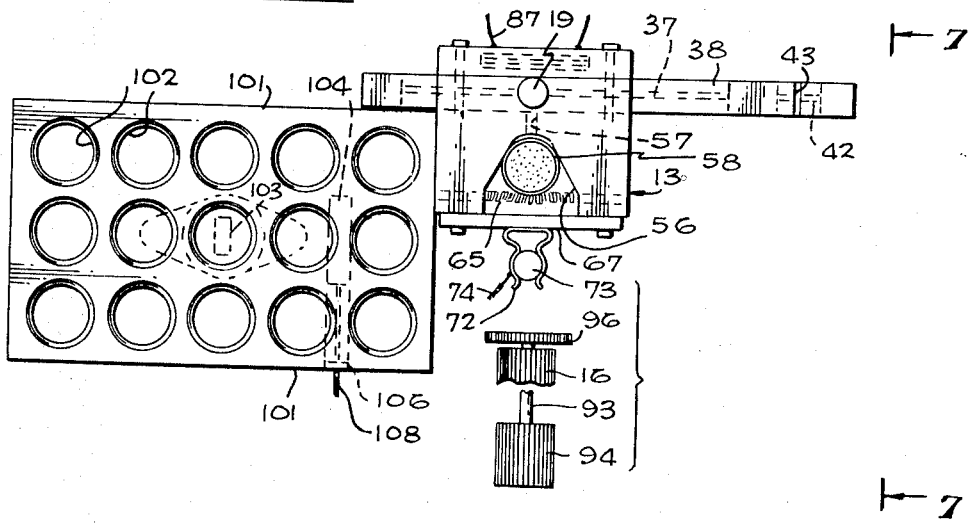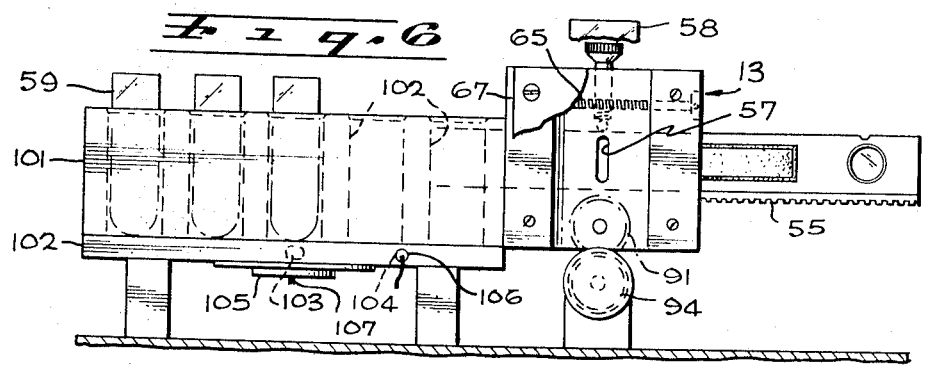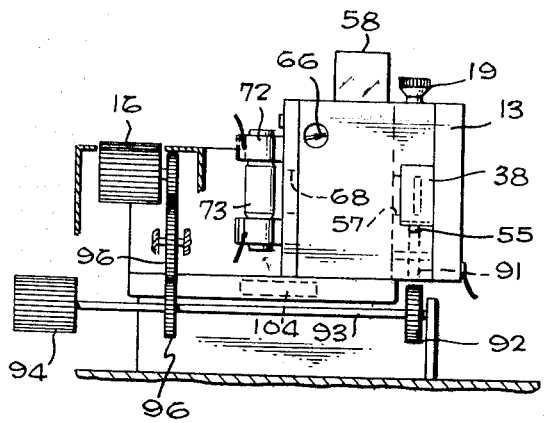

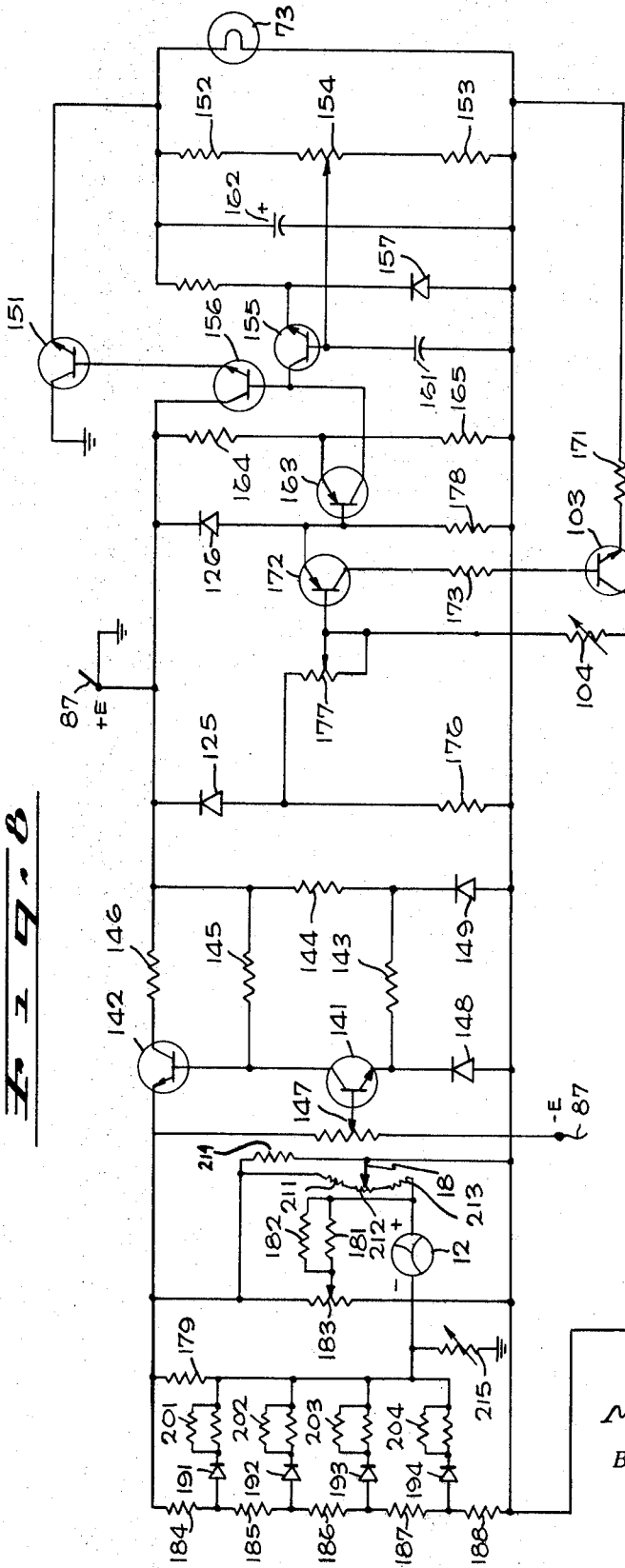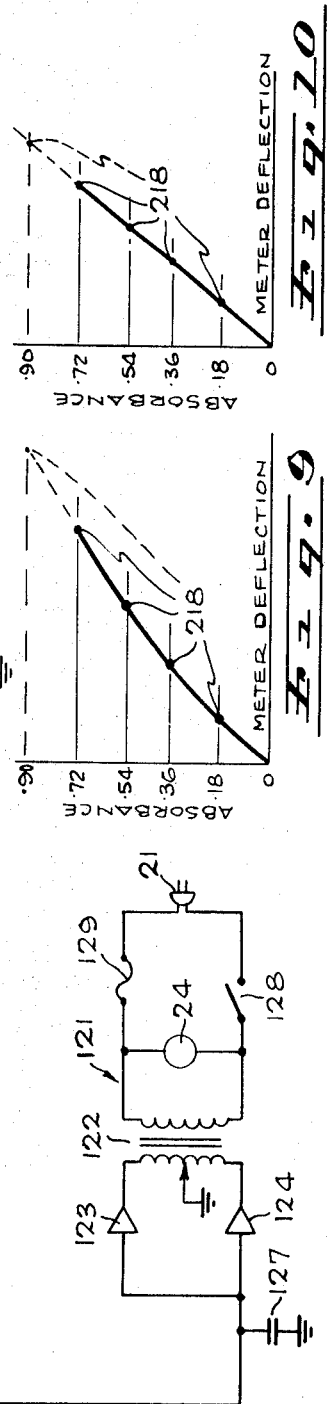

SPECTROPHOTOMETER CIRCUIT WITH LINEAR RESPONSE TO ABSORBANCE

BACKGROUND OF THE INVENTION

1. Field of the Invention

This invention relates to photometers, and more particularly to a novel photometer which is linear in response with respect to absorbance.

The great strides that have been made in the field of clinical chemistry are largely the result of the development of improved methods for the accurate analysis of blood, tissues, urine, and other biological materials. Chief among these methods, and of increasing importance are the techniques based upon the production of colored solutions in such a way that the intensity or depth of color so obtained may be used as a measure of the concentration of the substance being determined. Such use of color as an index of concentration is referred to in broad terms as colorimetric analysis, or colorimetry, and any instrument used for color evaluation is likewise broadly called a colorimeter.

More accurately, however, the term colorimetry is applied to those techniques in which the colored solution representing the substance in unknown concentration is somehow brought into exact color match with s suitable standard color. The instrument employed in making the color match is a colorimeter.

Analytical procedures based upon the direct measurement of color intensity in terms of light absorption at specific wave lengths are known as photometric techniques, and the instrument used in them is called a photometer. Photometry, in the sense that the term is understood by the analytical chemist, involves the measurement of the light-transmitting power of a solution in order to determine the concentration of light-absorbing material present in the solution. For purposes of simplicity the term "light" is used in place of the more inclusive term "radiant energy"; however, it must be understood that unlike colorimetric procedures, which are limited to the visible portion of the spectrum, the principles of photometry are as applicable to the absorption of energy in the ultraviolet and infrared portions of the spectrum as they are to absorption in the visible region, and increasing analytical use in being made of this fact.

The ability of a solution to transmit light is known as its transmittance, T. The transmittance $T_c$ of a solution containing containing a concentration $c$ of light-absorbing material is the ratio of the intensity $I_c$ of light emerging from the solution to the intensity $I_b$ of light emerging from a reference solution, usually the colorless solvent or reagent blank, both solutions being examined under equivalent conditions of wavelength, incident light intensity, and length of light path through the solutions; i.e.

$$T_c = \frac{I_c}{I_b}$$

Transmittance is thus a relative measurement and is always less than 1.0 if light-absorbing material is present. Commonly the transmittance of a solution is expressed in terms of its negative logarithm, or the value of $-T$, where T is the transmittance. The value of $-\log T$, is known as the optical density, D, or frequently as the extinction, E, or the absorbance, A, of the solution.

The transmittance of a solution containing light-absorbing material depends upon the nature of the material, the wavelength of the light, and the amount of the material in the light path; this latter depending in turn upon the concentration $c$ of substance and the length of the light path through the solution, 1. Beer's law states that a given wavelength, $$-\log T = k \cdot 1 \cdot c,$$

where $k$ is a constant characteristic for the substance. The quantity $-\log T$ has already been defined as the optical density, D, of the solution; thus, where Beer's law is applicable, the optical density is directly proportional to concentration, or $$D = k \cdot c$$

This equation is the foundation upon which photometric analysis is based.

2. Description of Prior Art

Photometers have been developed using visual or photographic means for establishing the intensity of light emerging from a solution; however, by far the most common and most accurate prior art devices employ photoelectric means for this purpose. Generally these means utilize either a photovolteic cell or a photoemissive tube. Light passing from the solution is made to impinge on one or the other of these. In instruments employing the former the current produced is registered on a microammeter or low sensitivity galvanometer. In those using the latter the incident light sets up a current which may be readily amplified. Some instruments of the latter type incorporate a photomultiplier tube which internally amplifies the current initially produced by the impinging light from the solution.

In all of these prior art devices the current measured is a function of the transmittance of the solution and is more or less linear with respect to transmittance. As noted earlier, transmittance, or percent transmittance as compared with standard solutions in the clinical procedures involved, is a logarithmic function of the concentration of the solution being assayed. To be of value in the determination of concentration for clinical purposes transmittance must be converted to its equivalent optical density. In the past this has been done by time consuming and tedious reference to a table of logarithms or a specially prepared nomograph, or by means of expedients such as a conversion meter or a manually operated logarithmic cam or logarithmic slide wire associated with the photometer itself. A more sophisticated and more expensive type of instrument uses a photomultiplier tube with its attendant high-level dark current noise, and employs a negative feedback loop circuit including a multistage amplifier to convert the photoelectric output electronically to a logarithmic function. The need for an instrument which is inherently linear in response with respect to absorbance, and thus to concentration, has long been felt heretofore never satisfied. The subject invention is such an instrument.

SUMMARY OF THE INVENTION

The heart of the subject invention is a novel linearizing circuit which biases a simple, low-noise, solid-state photodetector and the photometer power supply through a series resistor and a diode resistor network thereby permitting the slope of the detector's output to be altered at will over a number of selected increments. Properly trimmed, this negative bias circuit effectively compensates not only for the nonlinear characteristic of the detector, but also for any nonlinearity in the other components of the photometer circuit. A special lamp circuit is provided for varying and accurately controlling the voltage supplied to a conventional lamp and thereby adjusting the light intensity. This feature eliminates the need for the variable slit or aperture found in nearly all prior art photometers, while assuring uniform spectral purity of all wavelengths and excellent stability. Interchangeable monochromatic interference filters, or, alternatively, a movable continuous spectrum filter, may be positioned in the path of the light emerging from the sample. The sample itself is supported in a thermostatically controlled cuvette compartment which maintains not only the sample's temperature, but that of the photodetector and the light filter as well constant at all times both before and during the actual reading.

OBJECT OF THE INVENTION

The principal object of the subject invention is to provide a photometer which is linear in its response with respect to absorbance and concentration.

Another object is to provide such a photometer having high sensitivity and accuracy over a broad range of light wavelengths and solution concentrations.

Another object is to provide an instrument having these characteristics without resort to the use of photomultiplier devices with their attendant high dark current noise-to-signal ratios.

Still another object is the provision of an instrument capable of maintaining stability for extended periods of operation.

Yet another object is the provision of means in such an instrument for obtaining and utilizing the maximum spectral purity from a plurality of monochromatic interference filters or from a continuous spectrum variable filter.

A further object is the provision of a photometer employing relatively inexpensive solid-state circuitry and components to minimize the cost of manufacture and maintenance.

Another object is to provide an instrument of the type described which, once linearized, does not require further linearization, and which, by virtue of its linear response characteristics, does not require multipoint indexing with each new analysis.

Still another object is the provision of such an instrument employing a variable-intensity light source, and thereby eliminating the need for a variable geometry light aperture and optical bench, with their associated adjustments.

Yet another object is the provision of such an instrument having a thermostatically controlled integrated cuvette compartment, interference filter and photodetector, for continuously maintaining the temperature of the samples, the filter in use, and the detector itself.

Other objects will be perceived from a reading of the following detailed description of one preferred embodiment of the subject invention taken in connection with the appended drawings, in which:

BRIEF DESCRIPTION OF THE DRAWING

FIG. 5 is a partial top plan view of the cuvette assembly, incubator block and filter selector;

FIG. 6 is a partially cut away front elevation of the portion of the invention shown in FIG. 5;

FIG. 7 is a side elevation of the portion of the invention shown in FIG. 5, taken in the direction 7–7;

FIG. 8 is a schematic diagram of the electrical circuitry of the subject invention;

FIG. 9 is a plot illustrating the uncorrected response of the subject instrument;

FIG. 10 is a plot illustrating the response of the same of instrument after linearization.

Wherever practicable, like numerals are used in the several FIGS. to depict the same or similar components.

DESCRIPTION OF THE PREFERRED EMBODIMENT

Figure 1:
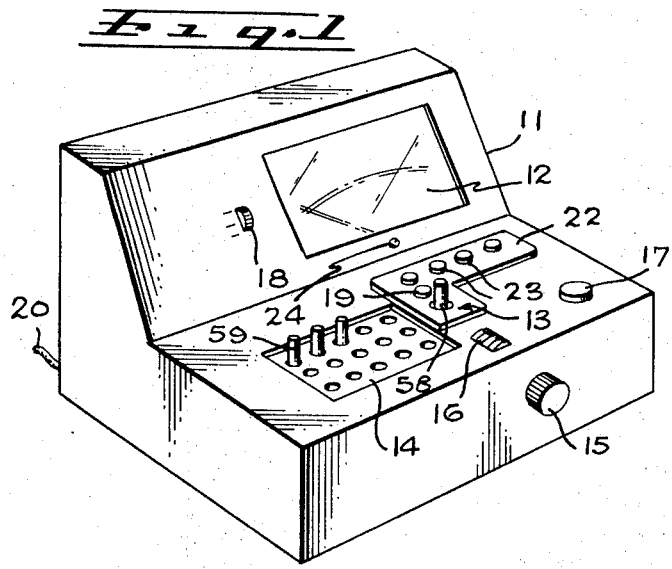
FIG. 1 is a perspective view of a photometer embodying the invention.

Referring to FIG. 1, externally viewed the subject photometer comprises an enclosure 11 preferably formed of an attractive, high-impact, chemically resistant plastic material, a sensitive microammeter 12, a cuvette holder 13, and incubator block 14, a filter selector knob 15, a range selector switch 18, a filter lock knob 19, and an electrical cord 20 to connect the unit to a wall outlet or similar source of electrical power. Removable cover plate 22, held in place by a plurality of large headed threaded fasteners 23, is provided for access to the cuvette holder-light source-light filter-photodetector assembly (not shown in FIG. 1), and to permit insertion, removal, and adjustment of the exciter lamp and light filter assembly. An indicator lamp 24 is illuminated when the instrument is turned on by switch means which may be incorporated in range selector switch 18.

Figure 2:
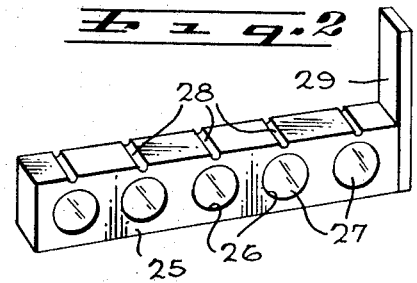
FIG. 2 is a perspective view of a filter holder containing a plurality of monochromatic interference filters.
Figure 3:
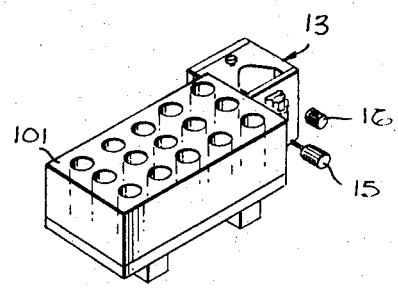
FIG. 3 is a perspective view of the integrated cuvette compartment and incubator block assembly.
Figure 4:
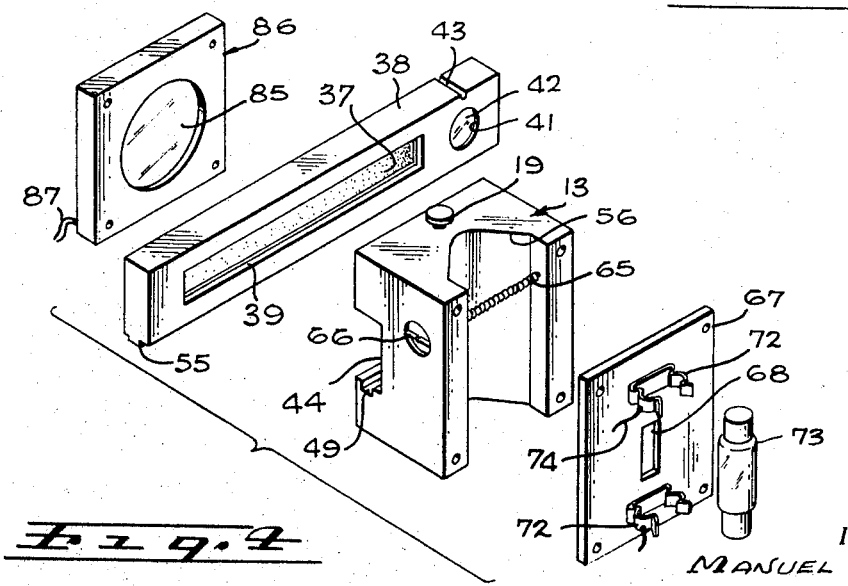
FIG. 4 is an exploded perspective view showing the arrangement of the light source, the cuvette compartment, and alternate form of continuous spectrum interference filter, and the photodetector.

FIG. 2 illustrates one form of the light filter assembly. It comprises a phenolic filter holder 25 having a plurality of apertures 26, each containing an individual interference filter 27 chosen to cover the range of frequencies most often used in the type of analysis for which the instrument is to be employed. Detent grooves 28 cooperating with conventional spring-biased detent means (not shown) associated with the filter assembly holder furnish means for positioning the desired filter in the light path when the instrument is in operation. With this type of assembly, filter selection is accomplished manually by conventional means such as a selector arm 29 attached to filter holder 25 to project upwardly through a slot (not shown) in enclosure 11.

FIGS. 3—7 illustrate the construction of the cuvette holder-incubator block-lamp-light filter-photodetector-filter selector assembly. In this preferred form of the invention, a continuous spectrum filter 37 is employed in place of the individual filters shown in FIG. 2. Filter holder 38 is provided with an elongated slot 39 holding a continuous spectrum interference filter covering the entire range of light frequencies likely to be utilized in analysis. In addition, a separate opening 41 is fitted with an ultraviolet interference filter 42 for use in ultraviolet photometry. A detent 43 is located above ultraviolet filter 42 to insure the proper positioning of this filter in the light path. A filter holder guide 44 formed in the rear side of cuvette holder 13 receives filter holder 38, and is provided with a groove 49 adapted to receive a rack gear 55 formed in the lower edge of filter holder 38.

A cuvette compartment 56 is machined into the front face of cuvette holder 13. A fixed-geometry light aperture 57 in the rear wall of cuvette holder 13 allows light to pass from compartment through filter 37. The walls of cuvette compartment 56 diverge outwardly at an angle of from 25° to 35°, and preferably 30° from a plane passing vertically through the center of the compartment, and the compartment 56 is sufficiently deep to accommodate the various sizes of test tubes, culture tubes and cuvettes most commonly used in clinical laboratories. The 60° outwardly divergent angle of the walls has been chosen to direct the maximum amount of light entering the compartment from the light source and focused by the cylindrical test tube or cuvette to pass through aperture 57. The cylindrical tube or cuvette 58 itself acts as a collimating lens in the light path. The height of aperture 57 is chosen to limit the exposure of the detector 85 to the central portion of the light beam. The aperture width is selected to eliminate the emission of diffused light from compartment 56 while passing the highly collimated central portion of the light beam. By way of example, an aperture 0.500 inch high and 0.187 inch wide is employed with optimal results in a unit having the photodetector mounted with its face 0.375 inch from the aperture. It has been found that this geometric configuration allows approximately 80 percent of the light passing through the tube 58 to be directed through the aperture 57.

A tension spring 65 is mounted horizontally across the wider portion of compartment 56 to retain a cuvette or test tube 58 in contact with the inner walls of the compartment 56 and centered vertically in front of and completely covering aperture 57. A pair of holes bored through the sides of holder 13 to accept the ends of spring 65 and removable pins 66 adapted to engage hooks or loops formed in the ends of spring 65 furnish convenient mounting means.

For reasons which will be discussed in greater detail later, the cuvette holder 13 is preferably machined out of aluminum or some other material having a high coefficient of heat transmission.

An opaque lamp mounting plate 67, preferably of phenolic resin or some other heat-resistant material is removably attached, for example by means of screws, to the face of cuvette holder 13 covering the open side of cuvette compartment 56. A slot 68 centered in plate 67 provides a light port into cuvette compartment 56.

Conventional lamp brackets 72 are mounted on the face of plate 67 above and below slot 68 to receive and securely hold a bayonet-type lamp 73 in vertical alignment in front of slot 68.

A conventional solid state photodetector 85 with its lens cover is hermetically sealed in protective housing 86, made of a heat transmitting material, such as aluminum. Housing 86 is removably attached to the rear face of cuvette holder 13 by means such as screws. Detector output leads 87 connect the photodetector 85 to the electronic circuitry contained within enclosure 11.

A variety of conventional means may be employed for positioning the interference filter assembly with the desired portion of the continuous spectrum filter 37 in the light path between the sample and test tube 58 and photodetector 85. Preferably the necessary fine adjustment is accomplished by means of a pinion gear 91 cooperating with the rack gear 55 on the lower edge of filter holder 38 and driven by a drive gear 92 mounted on rod 93 suspended under the chassis of the instrument. A large selector knob 94 is mounted on the end of rod 93 projecting forwardly of enclosure 11. If desired, the filter selector dial 16 may be connected to rod 93 by means of a gear train 96 to provide a continuous direct visual reading of the filter wavelength centered in the light path.

In addition to providing an exceptionally sturdy assembly, this arrangement, having the filter positioned between the sample and the photodetector, with the sample tube shielding the light aperture 57 from any ambient light which might enter compartment 56, substantially reduces, if not eliminates the need to control the illumination around the instrument.

Incubator block 101, of aluminum or a similar heat-transmissive material, is either formed on, or attached in thermal-communication with, cuvette holder 13. This block 101 is provided with a plurality of recesses 102 in its upper surface to receive a number of test tubes or cuvettes 59. Recesses 102 are sufficiently deep to admit the tubes or cuvettes 59 so that substantially all of their contents lie within block 101.

Either a separate heater plate 102, or block 101 itself, is provided with a heater 103, preferably a heat-dissipating power transistor, and a heat-sensing device such as thermistor 104. Removable access plate 105 and cap 106 provide means for inspecting and replacing the heater 103 and thermistor 104, respectively. Leads 107 and 108 furnish power to the heater and connect thermistor 104 to the instrument's electrical circuit.

FIG. 8 illustrates schematically the electronic circuitry contained within enclosure 11.

Alternating current is carried to direct current power supply 121 by means of cord 21. The power supply 121 comprises a half-wave bridge rectifier circuit including transformer 122, rectifier diodes 123, 124, 125, 126 and capacitor 127. Indicator lamp 24 is connected across the circuit, and is illuminated when the unit is energized by the closing of switch 128. As indicated earlier, switch 128 may be incorporated into range selector switch 18, or may be placed separately on enclosure 11. Fuse 129 prevents the dangerous overloading of power supply 121. An output of from 20 to 30 volts of direct current is more than adequate to drive the instrument and its accessory equipment, including a standard linear recorder, if desired.

Current from power supply 121 is fed directly to the power supply for lamp 73, the temperature controlling circuitry for incubator block 101 and cuvette holder 13, and the power supply for photodetector 85 (not shown in FIG. 8). The detector 85 is connected across its power supply circuit by leads 87, as shown.

The detector power supply comprises transistors 141 and 142, their associated biasing resistors 143, 144, 145, 146, potentiometer 147, and zener control diodes 148, 149. The base of transistor 141 goes to the wiper of potentiometer 147, which sets the detector supply voltage. The voltage of the emitter of transistor 141 is precisely controlled by biasing diodes 148, 149 and resistors 143, 144. The collector of transistor 141 drives the base of transistor 142 and is in turn biased by resistor 145. Resistor 146 limits and controls the collector current of transistor 142. The emitter current of transistor 142 is the detector supply.

This power supply circuit allows the detector supply voltage to be adjusted to compensate for the discrete characteristics of the particular photodetector 85 installed in the instrument and the degree of spectral sensitivity desired. The application of Zener controls 148, 149 in series with the emitter of transistor 141 permits the applied detector voltage to be varied over a wide range.

The emitter of transistor 151 feeds tungsten filament lamp 73. A voltage divider network comprising fixed resistors 152, 153 and a sensitive potentiometer 154 is tied across the lamp power supply. Knob 17 controls potentiometer 154.

The wiper of potentiometer 154 is tied to the base of transistor 155, whose collector feeds the base of transistor 156. The emitter of transistor 156, in turn, drives the base of transistor 151. The voltage at the emitter of transistor 155 is established by resistor 152 and primary Zener diode 157. Capacitors 161, 162 provide additional filtering and enchanced stability for the lamp power supply. The voltage divider network 152, 153, 154 provides means for very accurately regulating the voltage supplied to, and thereby the intensity of, lamp 73.

The lamp supply is further stabilized by means of a bias network including transistor 163, resistors 164, 165, and the voltage divider formed by rectifying diode 126 and resistor 167. This divider controls the potential of the base of transistor 163, and resistors 164, 165 regulate its emitter voltage, which is fed to the base of transistor 156.

The incubator block and cuvette compartment assembly temperature controlling circuit comprises power transistor 103, whose emitter is fed through a power resistor 171. The heat dissipated by transistor 103 is distributed by conduction throughout incubator block 101 and cuvette holder 13.

Thermistor 104 within block 101 responds to minute variations in temperature and feeds back to the base of transistor 172, the collector of which drives the base of transistor 103 through current-limiting resistor 173. Rectifier diode 125 and resistor 176 form a voltage divider which biases the voltage of transistor 172 through variable resistor 177. The emitter current of transistor 172 is supplied by the voltage divider formed by rectifier diode 126 and resistor 178.

With this circuit the heat given off by transistor 103 is continuously proportional to the variation sensed by thermistor 104 between the actual temperature of incubator block 101 and cuvette 13, and the desired temperature, as indicated by the setting of potentiometer 177. That is, the greater the variation, the greater the amount of heat generated to bring block 101, cuvette holder 13, filter 27, 37 and photodetector 85 back to the desired temperature. In practice this arrangement has demonstrated the ability to maintain block 101 and holder 13 and its associated components within ±0.1° C. of a preselected temperature for hours and even days.

The characteristic response of the photometer circuit itself tends to be disproportionately large with increasing absorbance, that is, with decreasing detector output. To correct this deficiency and achieve a response which is substantially linear with absorbance, a linearizing network incorporating a plurality of negatively biased diodes is employed.

Current from the photodetector 85 is drawn through resistor 179 and across the network, which comprises a plurality of resistors 184, 185, 186, 187, 188, diodes 191, 192, 193, 194, and the parallel resistors of decade boxes 201, 202, 203, 204. If desired, potentiometers could be substituted for the decade boxes 201, 202, 203, 204. As will be seen, the number of diodes used in this network may vary, but generally three or four are needed to achieve linearity over 2.0 absorbance units to an accuracy of within 0.5 to 1.0 percent.

The voltages at the junctions of resistors 184, 185, 186, 187 and 188 establish the points at which diodes 191, 192, 193, and 194, respectively, begin to conduct to their associated resistances 201, 202, 203 and 204, which are adjusted to determine the amount of current drained away from the photodetector 85 through the diodes.

The current carried by diodes 191, 192, 193, 194 increases logarithmically with their junction voltages. As more current is passed, each diode's response rapidly becomes substantially linear. By proper selection of resistors 184, 185, 186, 187, 188 and careful trimming of decade boxes or potentiometers 201, 202, 203, 204, the photometer circuit can be adjusted to respond linearly with the output of detector 85 despite the nonlinear characteristics of the circuit's components.

The actual linearizing of the instrument requires a great deal of care if a high degree of accuracy is to be achieved, but the procedure is a relatively simple and straightforward one. Essentially, the response of the photodetector 85 and the photometer circuit is determined under a fixed set of operating conditions by taking into account the changes in the intensity of lamp 73, as reflected by the changes in the lamp's supply voltage, required to obtain a given scale deflection on meter 12, and the linearizing network is adjusted to compensate for any nonlinearity observed. Once so adjusted, the instrument will remain linear without further correction throughout a wide range of varied operating conditions.

The linearizing procedure begins with the instrument activated by means of switch 128 allowed to warm up for 3 to 5 minutes. The photometer power supply is set at about 6 volts DC by adjusting the wiper of variable tap 217.

A standardized test solution having known absorbance characteristics is prepared or obtained, and introduced into a clean, unscarred 15 millimeter culture tube. Preferably this solution should be free of turbidity and should not have spectural peaks which are sharper, or narrower, than the band width of the particular interference filter 27 or 37 being used. By way of example, a clear aqueous solution having an absorbance of about 0.18 units at 5,000 A. may be utilized conveniently.

Filter holder 25 or 38 is adjusted to position the 5,000 A filter 27 or the 5,000 A. band of continuous filter 37, in the light path between compartment 56 and detector 85. In the latter instance this adjustment is accomplished by means of filter selector knob 15, and the filter holder 38 is locked in place by means of lock knob 19. A second clean unscarred matched culture tube is charged with pure water and inserted into cuvette compartment 56. The intensity of lamp 73 is then carefully adjusted by means of knob 17 connected to potentiometer 154, until meter 12 reads "0," indicating no absorbance by the water. It should be noted that even if the water, or other solvent if a nonaqueous standard solution is used, demonstrated light absorbing qualities, the zeroing of the instrument by adjustment of the lamp intensity automatically compensates for this characteristic. Once the instrument is thus zeroed, the tube containing the standardized solution is substituted for the tube containing the water blank, and variable resistor 183, controlling the gain of meter 12, is adjusted until meter 12 reads "0.18" or 0.18 absorbance units, the known absorbance of the standard.

The water blank-containing tube is reinserted into compartment 56, and the intensity of lamp 73 reduced by adjusting potentiometer 154, until meter 12 reads "0.18" again. The standard-containing tube is then substituted for the blank tube and the deflection of meter 12 noted.

Once again the standard is removed and the water blank replaced in compartment 56, and the lamp power supply readjusted by means of knob 17 to give the same meter deflection as that noted at the preceding setting for the standard solution. As before the standard solution is then substituted for the water blank and the deflection of meter 12 recorded.

By repeating this process, the successive deflections of meter 12 associated with each incremental change in absorbance are determined and plotted on graph paper. FIG. 9 shows the typical appearance of the response curve. Predictably, this plot demonstrates that as the light flux diminishes, the meter deflection associated with an incremental change in absorbance increases. The aim of the linearizing process is to adjust the instrument by means of the linearizing network so that the plotted deflection remains substantially constant for each unit change in absorbance.

Resistors 179, 184, 185, 187, 188, determine the location of the breakpoints 218, the points where more or less abrupt changes in the slope of the response curve occur. By trimming or padding decade boxes of adjusting these resistors the shape of the response curve of the instrument can be altered. That is to say the changes in response can be made to occur at preselected points across the absorbance scale.

For convenience the location of the breakpoints 218 can be described in terms of the input values read on meter 12 as functions of full scale in absorbance. Preferably the first of these breakpoints 218 is made to correspond to 18 percent—25 percent of the full absorbance scale, the second to 35 percent—40 percent of full scale, the third to 50 percent 70 percent of full scale, and the fourth to 80 percent—100 percent of full scale.

The actual correction of the instrument's deviation from an ideal linear response curve is accomplished by trimming or padding decade boxes of adjusting potentiometers 201, 202, 203, 204 allows diodes 191, 192, 193, 194 to conduct at the voltages corresponding to the successive breakpoints 218 shown on the plotted response curve.

FIG. 10 shows the typical appearance of the response curve after the instrument has been linearized.

While four resistor/diode elements are generally quite adequate for this purpose, if the particular photodetector 85 selected should exhibit exceptionally poor response characteristics, more than four such elements may be employed. If a fifth element is required, it would function in the linearizing network in the same manner as the previously described elements. Preferably the resistors of the five elements should be selected so as to divide the plotted response curve into five segments of approximately equal length covering the full scale on meter 12.

Once linearity has been established at one wavelength, it is quite unlikely that the instrument's response will be nonlinear at any other wavelength. Because the sensitivity of the detector 85 may change with varying wavelengths, however, in the routine operation of the photometer the intensity of lamp 73 is adjusted each time the setting of filter 27 or 37 is changed, to compensate for any resulting shift in the response curve of FIG. 10. This adjustment is accomplished by merely increasing or decreasing the light intensity until meter 12 reads "0" with a reagent blank.

Range selector switch 18, feeding through resistor 214, registers with resistors 211, 212, 213 having resistances for example of 50K, 150K and 450K, respectively, to vary the full-scale range of meter 12 from 0.0—0.5 absorbance units for weakly colored solutions, to 0.0—1.0 or 1.0—2.0 absorbance units for more strongly colored solutions. For most clinical work the absorbance of the samples being assayed will fall conveniently within one of these ranges. Variable resistor 215 is provided to give additional sensitivity control over meter 12.

Samples having absorbancy over full scale in any of the ranges can be made to read on-scale by adjusting the intensity in lamp 73 until meter 12 reads "0" with a reagent blank, reading and noting the meter deflection caused by a standard solution of the same reagent of known composition, and then readjusting the light intensity to zero the meter 12 with this standard in place. As long as the unknown sample to be tested follows Beer's Law, the linear response of the instrument allows its concentration to be determined by a simple comparison of its absorbance, as shown on meter 12, with that of the known standard. The concentration of the two solutions are proportional to their absorbances.

It is a characteristic of this instrument that for most clinical procedures lamp 73 is operated considerably below its rated voltage. This effectively extends its life substantially beyond its rated endurance. Typically, for example, lamp 73 may be rated at 12.8 volts, with an anticipated life of 2,000 to 4,000 hours. Operated at an average 6 to 8 volts, the same lamp may be expected to have more than double that life.

In addition, when it is desired to utilize the instrument to take measurements in the ultraviolet or near-ultraviolet range this may be accomplished readily by increasing the lamp voltage to shift the tungsten lamp output toward the ultraviolet range in response to the higher filament temperature, and adjusting filter holder 25 or 38 to place the ultraviolet filter in the light path. If desired a pressure actuated microswitch (not shown) may be provided in the bottom of cuvette compartment 56 to increase the lamp voltage for this purpose when a predetermined force is exerted on the cuvette or test tube by the operator. When the cuvette or tube is released the voltage would be reduced automatically, thus minimizing the time the lamp 73 is subjected to the higher voltage, and thereby avoiding excessive wear on the filament.

With the foregoing description in mind, I claim as my invention:

1. A spectrophotometer circuit comprising:
 a power source,
 a photodetector and
 a sensitive current measuring device connected in parallel in a first circuit; and
 a linearizing circuit including a biasing resistor shunted across said current measuring device, said linearizing circuit being connected with said first circuit for linearizing the response of said first circuit with respect to the absorbance of a sample of a phototransmissive material, said linearizing circuit comprising a plurality of diodes connected in parallel with said biasing resistor and means for selectively biasing said diodes to compensate for nonlinearity in said first circuit over a discrete portion of its response curve, thereby selectively altering the output of said photodetector and the input to said current measuring device.

2. The spectrophotometer circuit of claim 1 in which said biasing means include a pair of parallel biasing resistors in series with each of said diodes, one of said biasing resistors being a variable resistor.

3. The spectrophotometer circuit of claim 2 comprising in addition means associated with said first circuit for selectively varying the gain of said current measuring device.

4. The spectrophotometer circuit of claim 3 in which said means for varying the gain of said current measuring device include a variable resistor shunting said current measuring device.

5. The spectrophotometer circuit of claim 4 including in addition means associated with said first circuit for selectively switching the effective range of said current measuring device.

6. The spectrophotometer circuit of claim 1 in which said photodetector is connected in series with said linearizing circuit.